(12) United States Patent
Dudkiewicz et al.

(10) Patent No.: US 12,019,681 B2
(45) Date of Patent: Jun. 25, 2024

(54) IDENTIFYING OBJECTS BASED ON FREE-FORM TEXT DESCRIPTION

(71) Applicant: Start.io Inc., New York, NY (US)

(72) Inventors: Gil Dudkiewicz, Even Yehuda (IL); Ran Avidan, Raanana (IL); Omri Barnes, Zichron Yaakov (IL); Yaniv Avraham, Kiryat Ono (IL)

(73) Assignee: START.IO INC., New York, NY (US)

( * ) Notice: Subject to any disclaimer, the term of this patent is extended or adjusted under 35 U.S.C. 154(b) by 10 days.

(21) Appl. No.: 17/741,716

(22) Filed: May 11, 2022

(65) Prior Publication Data

US 2022/0365976 A1   Nov. 17, 2022

Related U.S. Application Data

(60) Provisional application No. 63/187,133, filed on May 11, 2021.

(51) Int. Cl.
*G06F 16/901* (2019.01)
*G06F 16/2457* (2019.01)

(52) U.S. Cl.
CPC .... *G06F 16/9024* (2019.01); *G06F 16/24578* (2019.01)

(58) Field of Classification Search
CPC ........... G06F 16/9024; G06F 16/24578; G06F 16/3334; G06F 16/313
See application file for complete search history.

(56) References Cited

U.S. PATENT DOCUMENTS

| | | | | |
|---|---|---|---|---|
| 9,471,606 | B1* | 10/2016 | Pedregal | G06F 16/335 |
| 9,785,696 | B1* | 10/2017 | Yakhnenko | G06F 16/30 |
| 2009/0164387 | A1* | 6/2009 | Armstrong | G06F 40/30 |
| | | | | 705/37 |
| 2013/0124574 | A1* | 5/2013 | Brettin | G16B 50/20 |
| | | | | 707/798 |
| 2014/0280114 | A1* | 9/2014 | Keysar | G06F 16/951 |
| | | | | 707/723 |
| 2014/0280576 | A1* | 9/2014 | Cowan | H04L 67/54 |
| | | | | 709/204 |
| 2017/0286565 | A1* | 10/2017 | Brave | G06F 16/2458 |
| 2018/0075359 | A1* | 3/2018 | Brennan | G06N 5/022 |
| 2018/0239751 | A1* | 8/2018 | Durr | G06F 16/951 |
| 2019/0163835 | A1* | 5/2019 | Scheideler | G06F 16/9024 |
| 2020/0387671 | A1* | 12/2020 | Durr | G06F 40/295 |

\* cited by examiner

*Primary Examiner* — Jorge A Casanova

(57) ABSTRACT

A method, apparatus and computer program product, the method comprising: obtaining a graph having a multiple nodes and one or more edges, each node comprising a set of entities having a common property and a subject, and each edge connecting two nodes and indicating a relationship therebetween; obtaining a query from a user, wherein the search query comprises a free-form text; extracting from the free-form one or more keyword combinations and one or more logic terms; for each keyword combination, creating a list of nodes from the graph based on a relevancy of the subject of each of the nodes with respect to the keyword combination; creating a collection of entities comprised in the list of nodes, said creating comprises filtering out entities associated with a node that is excluded based on the logic term; and providing a response to the query, wherein the response comprises the collection of entities.

20 Claims, 5 Drawing Sheets

IDENTIFYING OBJECTS BASED ON FREE-FORM TEXT DESCRIPTION

CROSS-REFERENCE TO RELATED APPLICATION

This application is a continuation of and claims the benefit of U.S. Provisional Patent Application No. 63/187,133, filed May 11, 2021, entitled "Finding Segments of Relevant Objects Based on Free-Form Text Description" which is hereby incorporated by reference in its entirety without giving rise to disavowment.

TECHNICAL FIELD

The present disclosure relates to determining sets of relevant objects based on user input in general, and to determining relevant objects based on free-form text, in particular.

BACKGROUND

Searching for relevant information has been a problem since the early days of humanity.

In recent decades since most of the information available to the human kind has been computerized, new horizons have been introduced to assist in searching for information, mainly using search engines. A search engine is an information retrieval system designed to help find information stored on a computer system. The search results are usually presented in a list and are commonly called hits. Search engines help to minimize the time required to find information and the amount of information which must be consulted. The most commonly used form of a search engine is a web search engine which searches for information on the World Wide Web. Further engines are provided specifically for searching within specific web sites.

The available search solutions are mostly suitable for searching a specific web site, a specific answer to a question, or for obtaining one or more information sources, where the user can receive the information or continue the search.

However, the available search engines and other solutions are less suitable for other types of information retrieval.

SUMMARY

One exemplary embodiment of the disclosed subject matter is a method for determining entities according to free-form text, comprising: obtaining a graph having a plurality of nodes and one or more edges, each of the plurality of nodes comprising a set of entities having a common property and a subject, and each of the edges connecting two nodes and indicating a relationship between the two nodes; obtaining a search query from a user, wherein the search query comprises a free-form text; extracting from the free-form text one or more keyword combinations and one or more logic terms; for each of the keyword combinations, creating a list of nodes from the graph based on a relevancy of the subject of each of the plurality of nodes with respect to the keyword combination; creating a collection of entities that are comprised in the list of nodes, wherein said creating comprises filtering out entities associated with a node that is excluded based on the one or more of the logic terms; and providing a response to the search query, wherein the response comprises the collection of entities. The method can further comprise enhancing the list of nodes in accordance with user input. The method can further comprise expanding the list of nodes in accordance with one or more edges. The method can further comprise generating the graph, said generating comprising: receiving annotated sets of objects, each annotated set of objects represented as a node in the graph; and creating relationships between pairs of annotated sets, each relationship represented as an edge between two nodes corresponding to the pairs of annotated sets. Within the method, one or more of the relationships is optionally created automatically. Within the method, one or more of the relationships is optionally created manually. Within the method, one or more of the relationships is optionally based on logical relationship. Within the method, the logical relationship is optionally selected from the group consisting of: contained in; similar; under a same hierarchy; and complementary. Within the method, one or more of the relationships is optionally based on subject-matter knowledge related to at least some of the plurality of nodes. Within the method, creating the list of nodes optionally comprises selecting nodes whose subject comprises one or more first words identical or related to one or more second word in the one or more of the keyword combination. Within the method, creating the list of nodes optionally further comprises adding one or more nodes which connected by an edge to a node present on the ordered list of nodes. Within the method, the edge is optionally associated with a word from the keyword combination. Within the method, the list is optionally ordered. Within the method, the list is optionally ordered by relevancy of the nodes, and the relevancy of a node is optionally based on combined relevancy of each word contained in the subject of the nodes to each keyword of one or more of the keyword combinations.

Another exemplary embodiment of the disclosed subject matter is a computerized apparatus for determining entities according to free-form text, the computerized apparatus having a processor, the processor being adapted to perform the steps of: obtaining a graph having a plurality of nodes and one or more edges, each of the plurality of nodes comprising a set of entities having a common property and a subject, and each of the edges connecting two nodes and indicating a relationship between the two nodes; obtaining a search query from a user, wherein the search query comprises a free-form text; extracting from the free-form text one or more keyword combinations and one or more logic terms; for each of the keyword combinations, creating a list of nodes from the graph based on a relevancy of the subject of each of the plurality of nodes with respect to the keyword combination; creating a collection of entities that are comprised in the list of nodes, wherein said creating comprises filtering out entities associated with a node that is excluded based on the one or more of the logic terms; and providing a response to the search query, wherein the response comprises the collection of entities. Within the apparatus, the processor is optionally further adapted to perform: receiving annotated sets of objects, each annotated set of objects represented as a node in the graph; creating relationships between pairs of annotated sets, each relationship represented as an edge between two nodes corresponding to the pairs of annotated sets. Within the apparatus, one or more of the relationships is optionally created automatically or is based on logical relationship. Within the apparatus, one or more of the relationships is optionally created manually. Within the apparatus, creating the list of nodes optionally comprises selecting nodes whose subject comprises one or more first words identical or related to one or more one second words in the one keyword combinations.

Yet another exemplary embodiment of the disclosed subject matter is a non-transitory computer readable medium retaining program instructions, which instructions when read by a processor, cause the processor to perform: obtaining a graph having a plurality of nodes and one or more edges, each of the plurality of nodes comprising a set of entities having a common property and a subject, and each of the edges connecting two nodes and indicating a relationship between the two nodes; obtaining a search query from a user, wherein the search query comprises a free-form text; extracting from the free-form text one or more keyword combinations and one or more logic terms; for each of the keyword combinations, creating a list of nodes from the graph based on a relevancy of the subject of each of the plurality of nodes with respect to the keyword combination; creating a collection of entities that are comprised in the list of nodes, wherein said creating comprises filtering out entities associated with a node that is excluded based on one or more of the logic terms; and providing a response to the search query, wherein the response comprises the collection of entities.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
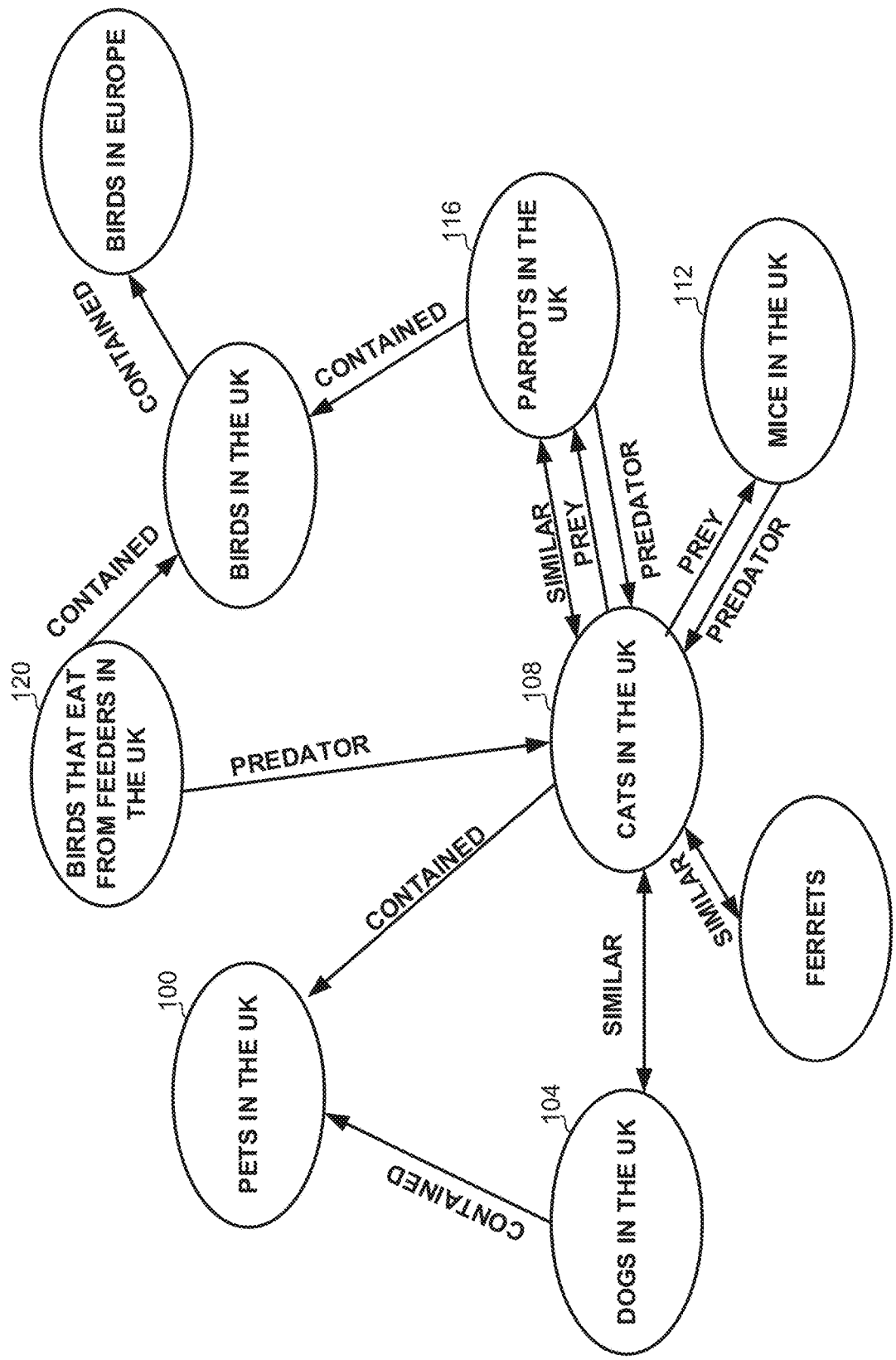
FIG. 1 is an exemplary graph representing knowledge in a first subject, in accordance with some exemplary embodiments of the disclosure.

The term "graph" used below is to be broadly construed to cover any group of categories (wherein each category may relate to a plurality of entities, also referred to as objects) and relationships therebetween. The categories may be depicted as nodes and a relationship between two categories may be depicted as edges connecting two nodes corresponding to the categories. A graph may be implemented as a data structure and/or contents of a database and/or any other form, indicating the nodes and edges. A graph may also have a graphical representation.

One technical problem dealt with by the disclosed subject matter is the need to provide an efficient searching method and system for situations in which the available search engines do not provide sufficiently good results. Such situations may include cases in which the general nature of the responses to queries is insufficient, since the query is specific to a certain field and involves logic terms. Such cases may relate to determining a subset of entities from a given collection which constitute a response to a query, based on free form textual description, such as a natural language sentence defining properties of the desired entities, a list of words without specific constituent syntax, a list of words separated by commas, or the like. The query may be associated with a user search, such as a search over a dataset, search for retail purposes, advertising criteria, filtering criteria of customers or users, or the like. As an example, a user may search for "birds that appear near the sea in Africa". A response to such a query may be required to comprise, if found, the list of birds that fulfill the property of appearing next to the sea in Africa, or a subset or a superset of the above. Additionally or alternatively, the query may comprise a list of words, such as "birds Africa sea". In further cases, the query may be more complex and may comprise explicit or implicit logic terms, for example "large birds that appear near the sea in Africa", or "birds that appear near the sea in Africa but are not white", or the like.

Another technical problem dealt with by the disclosed subject matter relates to the difficulty of searching information stored in a database. Entities in a database are related only if the relation is supported by the database schema. Moreover, information can be extracted from a database using predefined formats, such as queries rather than free form texts. Thus, in addition to the relations between information in a database being limited, a user who is not an expert cannot easily search for information in such source.

Yet another technical problem dealt with by the disclosed subject matter is to provide users with tools and methods for improving and updating their queries, such that the responses are more accurate.

Yet another technical problem dealt with by the disclosed subject matter is to enable the users to dynamically and efficiently update or enhance the query responses. In some exemplary embodiments, the users may want to eliminate portions of the result sets after reviewing thereof, decide to add or change expanding features, perform minor changes on the results, or the like. The outcome of the request or query of the user may be changed over time in order to make a campaign more effective.

One technical solution of the disclosure comprises receiving a user query expressed as free form text. The query may be analyzed using Natural Language Processing (NLP) techniques to identify keywords and logical terms. Then one or more graphs representing pre-annotated sets of entities and relations between the sets may be searched to determine a set or superset of entities relevant to the user query. The entities in the selected sets may then be reduced upon the logic term.

Referring now to FIG. 1, showing a graph in which the nodes represent sets of animals having a common property, such as pets in the UK 100, dogs in the UK 104 and cats in the UK 108. Each such node may be associated with entities. It may be noted that an object can belong to multiple sets. As an example, a dog object may belong to the subset of pets in the UK 100 as well as to the set of dogs in the UK 104.

The nodes may be created by a person such as a user, an expert in the field, a data scientist or the like, providing a list of entities and their association. Each node may thus be associated with a subject and a set of entities.

Additionally or alternatively, the nodes may be automatically created or enhanced upon data extracted from a database, specific texts, or any other information sources.

Figure 2:
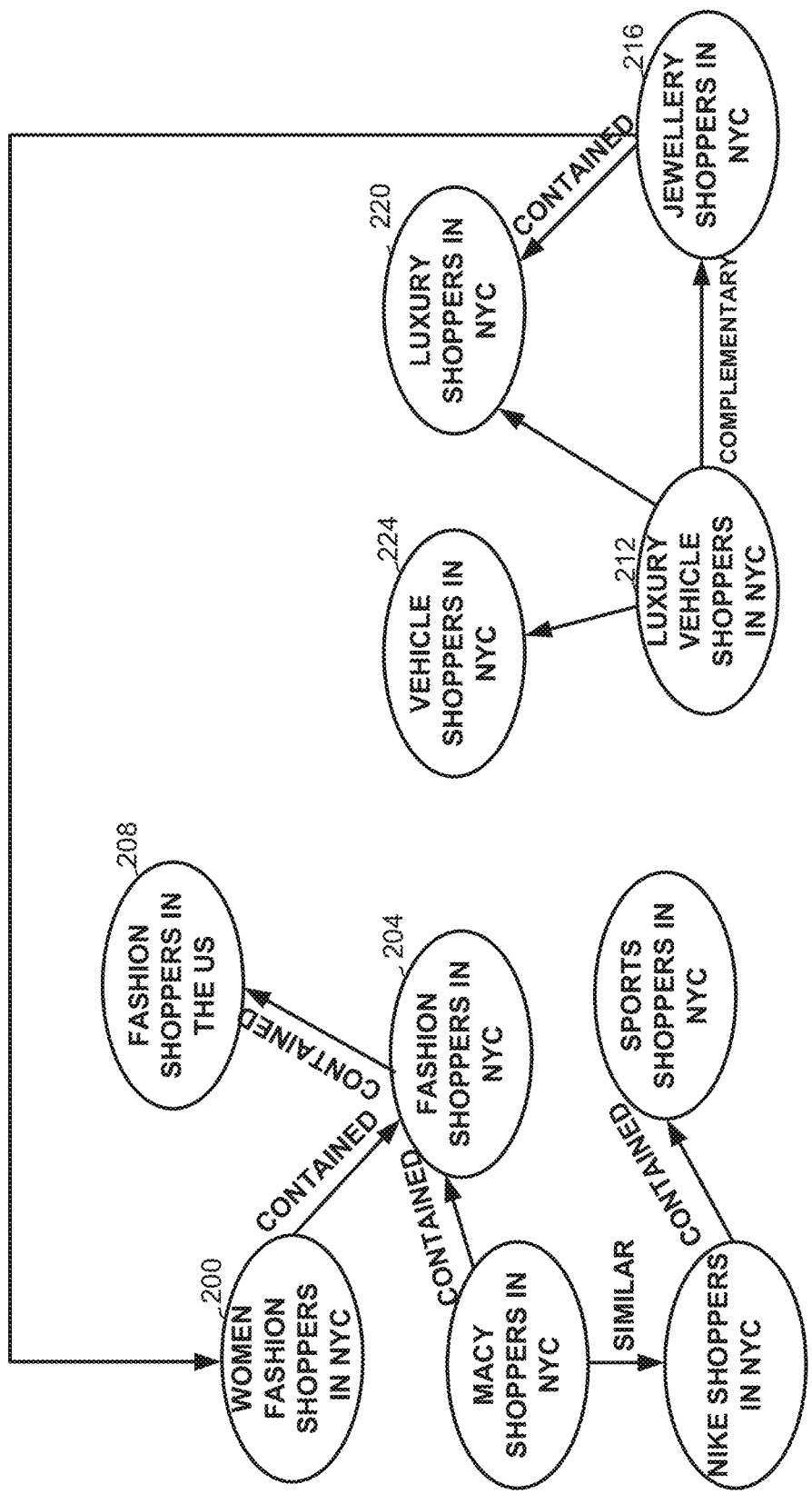
FIG. 2 is another exemplary graph representing knowledge in a second subject, in accordance with some exemplary embodiments of the disclosure

In another example, some sets or categories may be "prepacked", for example a category of people of shared demographic categories, while other sets may be customary packed based on criteria set by the user, such as categories of different types of shoppers for certain advertising agency, as shown in FIG. 2.

In some exemplary embodiments, the graph may be a directed graph. An edge in the graph may represent a property, a relation, an order, a connection, or the like, between sets of objects represented by the two connected nodes. The relation may be logical and may be deduced automatically or from the subject of the nodes or from the associated entities. For example, a first node such as "pets in the UK" 100 may contain all entities of a second node such as "dogs in the UK" 104, therefore a "contained" edge may be created from "dogs in the UK" 104 to "pets in the UK" 100. Some relations, such as "Similar", may be symmetrical and thus indicated by a two-directional edge.

Additionally or alternatively, the relation may refer to the subject matter of the graph and thus be indicated manually by a user or retrieved from an information source. For example, Cats in the UK 108 are predators of Mice in the UK 112, and Mice in the UK 112 are prey of Cats in the UK 108.

The user may then provide a query, for example in a free form text. The text may be analyzed for extracting one or more keywords, such as "dogs", "cats", "UK", or the like, and one or more logic terms, such as, "and", "not", "wherein", or the like.

Based upon the keywords, a collection of entities may be created, wherein each entity is associated with one or more nodes within the graph. The nodes may be selected upon the relevancy of the subject of each node to the keywords extracted from the query. For example, the relevancy of each word in the subject to each one of the keywords may be assessed, and the node may be assigned a rank based on a sum of the relevancy assessments of the keywords. The nodes having the highest rank may be selected, and the collection of entities may comprise the entities associated with the selected nodes.

Based upon the logical terms, the collection of entities may then be reduced, by removing certain nodes. For example, if a logical term contained in the query is an "and", then entities that are not contained in all the relevant nodes may be removed.

The collection of entities may then be provided as a response to the user's query. The response may comprise the relevant nodes, the collection of entities, or the like.

The user may change or update the query, the selected nodes, and the collection of entities. The updated information may be used for future repetitions if the search.

One technical effect of utilizing the disclosed subject matter is providing responses to queries phrased using free-form speech. The disclosure provides for complex specific responses which take into account the relationships between the keywords, which overcome the deficiencies caused by searching only by keywords.

Another technical effect of the disclosure relates to searching within a specific field while taking into account relations between sets of entities, wherein the relations may be based on logic rules and deduced automatically, or on specific subject-matter related knowledge. However, the search results are reduced in accordance with logic terms provided by a user, such that the responses are more accurate.

The disclosed subject matter may be used, for example, for scientific purposes, or for enabling dynamic Artificial Intelligent (AI) driven campaigns, by pinpointing the target audience. The target audience may be automatically updated based on dynamic testing, dynamic interaction with the user, automatic comparisons with other campaigns, or the like.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure.

Figure 3:
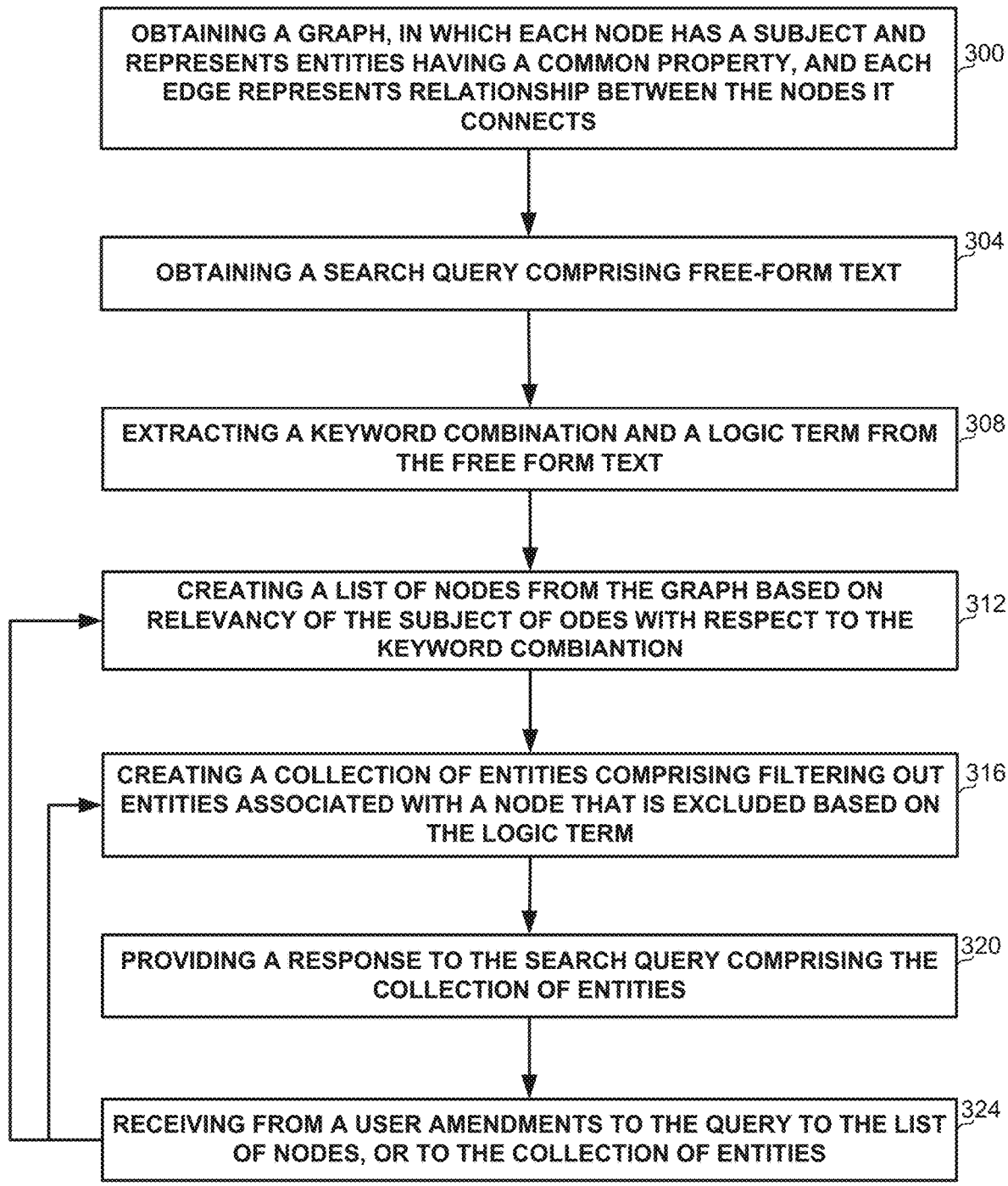
FIG. 3 is a flowchart of steps in a method for retrieving information, in accordance with some exemplary embodiments of the disclosed subject matter.

Referring now to FIG. 3, showing a flowchart of steps in a method for retrieving information, in accordance with some exemplary embodiments of the disclosed subject matter.

On step 300, a graph which may relate to a certain subject or field may be obtained. The graph may be comprised of nodes and edges. Each node may be associated with a subject, expressed for example by words, IDs, or the like. Each node may also be associated with, or even be created upon a collection of entities having a common feature. For example, a node may have a subject of "Dogs in the UK", and the entities may be certain dogs which can be found in the UK. The graph may further comprise edges, wherein each edge connects two nodes. An edge may be created upon logical connection between the nodes, such as similarity, one node containing all entities associated with the other node, or the like. Further edges may represent subject-matter relationship, such as prey-predator relationship.

On step 304, a search query may be obtained for example by a user entering the query using an input device, reading from a file, analyzing spoken audio, or the like. The search query may be of free-form text.

Referring again to example of FIG. 1, a query obtained in step 304 may be: "Animals that are used as pets in the UK and are not used as pets in France".

On step 308, the query may be parsed and analyzed to extract at least one keyword combination and at least one logic term. The keywords may be words extracted from the query. The words may be transformed into a normal form (such as present tense for verbs, singular form for nouns), stop words may be reduced, or the like. The keywords may be extracted using NLP techniques, such as Part of Speech Tagging (POST) techniques which may be utilized to find keywords in the text. The keywords may be noun-chunks, adjectives, logical connectors, or the like. First, noun-chunks may be identified. The noun-chunks may be nouns with the words describing them. Then, other adjectives that are not directly related to a noun may be found. Each found element may be considered a keyword. It may be noted that a "keyword" may in some cases be a phrase comprising multiple words rather than a single word.

In the example of FIG. 1, the keyword combinations determined on step 308 may be Pets in the UK 100, and Pets in France (node not shown).

The logical terms may indicate relationships, such as "and", "not", "or", "if", "if and only if", or the like. In some embodiments, the logic term may also be associated with the subject matter of the graph, for example contain words related to one or more edges, such as "prey", "similar", or the like.

On step 312, a list of nodes may be extracted from the graph, based on the keywords extracted from the query. For example, the relevancy of a subject of a node or a name of one or more entities within a node to one or more of the keywords may be determined. The relevancy may be determined upon the words being identical or similar. The relevancy of the node may then be determined as the sum, average, or any other combination of the relevancy of the node subject or entities to all the keywords. The relevancy may thus represent a probability that the entities associated with the node match the keywords, a similarity measurement between a keyword and a subject associated with the node, a similarity measurement to other keywords known to be associated with the node, or the like. As another example, the numerical evaluation may be based on a similarity measurement between a known brand or app to a category, such as similarity between Instagram™ and photography, similarity between Zara™ and fashion, or the like. As yet another example, the numerical evaluation may be based on similarity of entities in the set to a synonym of the keyword list, e.g., given the keyword "fowl", nodes associated with birds may be selected.

The nodes having the highest relevancy according to some metric may then be selected. For example, a predetermined number of nodes having the highest relevancy, all nodes having a relevancy exceeding a predetermined value, a predetermined percentage of the nodes which have the highest relevancy, or the like. In some embodiments, the nodes may be ordered, for example in accordance with their relevancy, while in other embodiments the order is of no importance.

In some embodiments, once a node is found to be relevant, additional nodes may be added, for example, based on set logic as applied through the edges of the graph. In some examples, if a first node is considered relevant, a second node contained within the first node may also be considered relevant. In further embodiments, a third node that contains the first node may also be considered relevant. In another example where the edge is related to the subject matter of the nodes, when searching for giant birds, the edge "Larger From" connecting one node related to birds to another may be relevant, even if the word "birds" does not exist in the other node, such as "flying dinosaurs".

In the example of FIG. 1, there are no outgoing edges from pets in the UK 100, and accordingly there are no expansion suggestions therefrom. However, Dogs in the UK 104 has one outgoing edge that represents potential expansion, and Cats in the UK 108 has six outgoing edges, each of which represents a potential expansion to include additional nodes.

Accordingly, the additional selected nodes for the keyword combination "Pets in the UK" 100 may be "Cats in the UK" 108 and "Dogs in the UK" 104 based on having a relation of "contained" with the node "Pets in the UK" 100.

Similarly, for the keyword combination "Pets in France" the (not shown) nodes of "Cats in France" and "Dogs in France" (both not shown) may be added.

It is appreciated that when calculating the relevancy of a node, the relationship with other nodes may be a factor in the calculation of both nodes or of the other node. As an example, the node of "Parrots" may be connected to the nodes of "Birds that Eat from a Feeder", such as in a containing relation, intersection, or the like, and the numerical evaluation thereof may be determined based on that relation. As another example, higher numerical evaluation may be determined for the set of dogs and the set of cats than the set of mice, or other sets of animals not comprised by the list. Accordingly, the sets of dogs and cats may appear before the set of mice if the list is ordered.

On step 316, a collection of entities may be created, by starting with the entities associated with the nodes selected on step 312, and filtering out the entities associated with nodes that are excluded based on the logic term extracted from the user query. For example, if the selected nodes are N1 and N2, wherein the entities of N1 are also contained in N2, and wherein the query comprises the term "and", node N2 may be removed such that the entities not contained in N1 are filtered out.

On step 320, a response comprising the collection of entities may be provided to the user, for example displayed visually, written into a file. Shown upon a visual representation of the graph, or the like.

On step 324, the user may provide amendments to the query, for example changing, adding or deleting one or more keywords or logical terms. Execution may then return to step 312 of crating the set of nodes. Additionally or alternatively, the user may provide amendments to the collection of nodes, in which case execution may return to step 316 of creating the set of entities. If the nodes are ordered the user may change the order therebetween, or the like. Additionally or alternatively, the human user may manually find new sets to be added to the ordered list of sets, such as using related categories, using relations between nodes to improve the ordered list of nodes, or the like. Additionally or alternatively, the user may provide amendments to the collection of entities. For example, the user may add, delete or change one or more entities.

For example, a query of "house animals" may be received. The list of annotated nodes can be dogs, cats, birds that eat from feeder, parrots, and mice. Each node may have other nodes that are connected to it by an edge. A user can erase the nodes of birds that eat from a feeder and mice, which she may not consider house animals. The user may add new nodes using the related categories, for example parrots, and use the relationship to improve the ordered set. The logic term may then be used to determine the actual entities sought by the free-form text. For example, if eventually the modes include pets and birds, the entities which correspond to both include parrots, which also have a separate node, but may also include a few hawks that are actually pets, although there is no specific node for them under pets.

Additionally or alternatively, the user (e.g., a advertiser) may be enabled to provide additional input such as comments, updates, changes or the like, using free-text, on the resulted custom audience. The additional input may be utilized to dynamically update the custom audience or any other outcome sets. In some exemplary embodiments, minor changes may be tested in the pre-loaded parameters in order to improve the audience building process, enhancing the results, making the campaign more cost effective, or the like.

It is appreciated that although step 324 is shown as a single step which takes place after the collection of entities is determined, in some embodiments the user may introduce changes at various stages, for example amend the query or the keyword list, after the keyword or logical term extraction, after the node selection, after the entities are determined, or the like.

At the end of the method, the query, the collection of nodes, and/or the collection of entities may be stored. The stored information may then be used, for example, for repeating the search as is or with changes at a later time.

In some exemplary embodiments, test cases may be automatically created for each query. The test sets may be representative of the entity collection and may be utilized to test the results before running a large scale campaign. A final set of entities may be created based on the testing results, such as building the set with the best conversion ratio, or the like. Additionally or alternatively, the user may be enabled to introduce additional input, in order to dynamically update the campaign based on the testing results.

Figure 4:
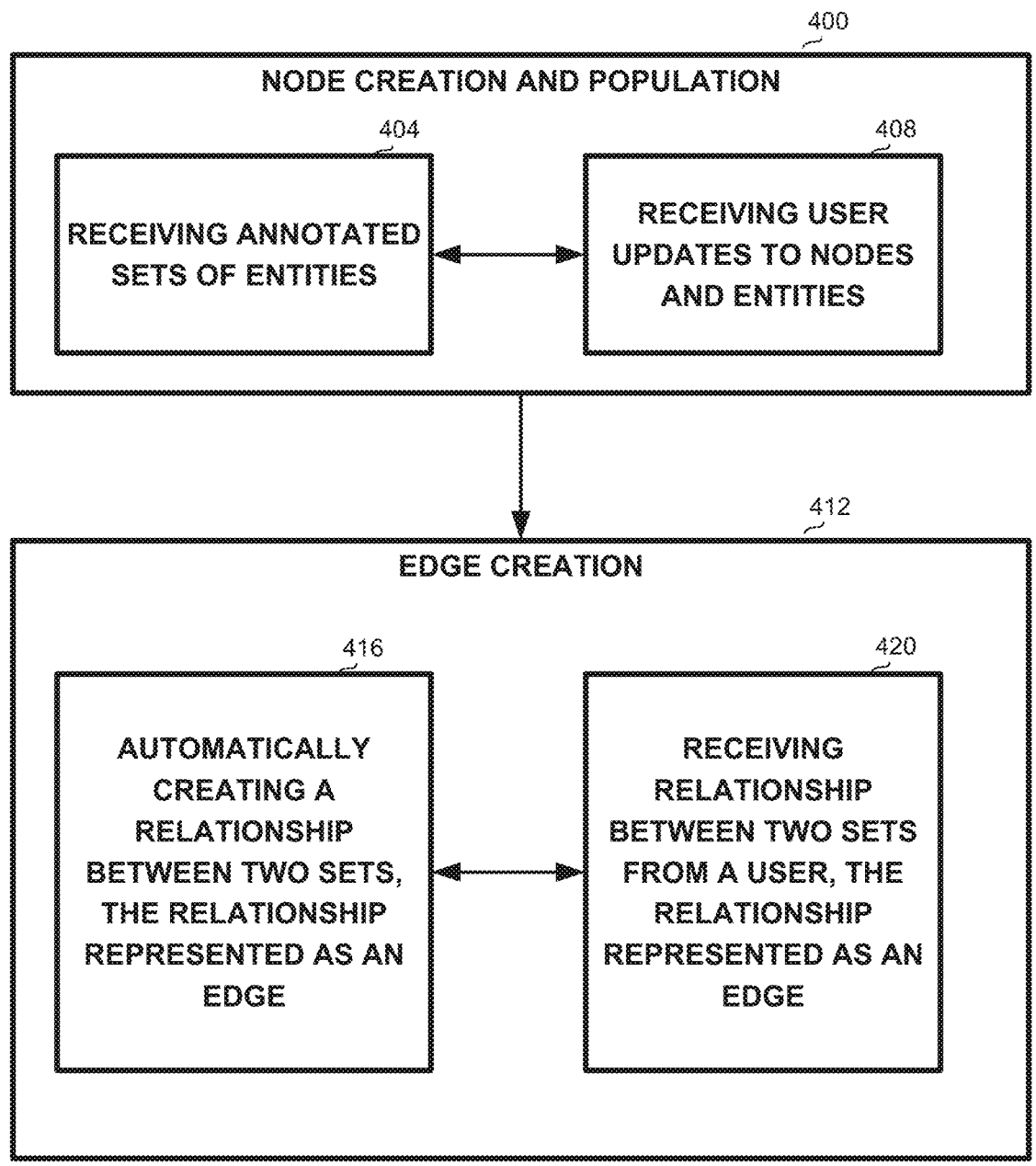
FIG. 4 is a flowchart of steps in a method for generating a graph, in accordance with some exemplary embodiments of the disclosed subject matter.

Referring now to FIG. 4, showing a flowchart of steps in a method for generating the graph, in accordance with some exemplary embodiments of the disclosed subject matter. The method of FIG. 4 may be performed as a pre-processing stage, after which the graph may be obtained as in step 300 above. However, if a query is received before the graph is available, the graph may be created at that time.

On step 400, nodes may be created and populated.

Step 400 of creating and populating the nodes may comprise step 404 in which the nodes may be automatically created upon annotated sets of entities. The sets of entities may be received from a computerized system such as a database, from a user, extracted from texts, or the like. It will be appreciated that entities within the same node may have one or more common properties, which may or may not be expressed by the node's subject.

On step 408, a user may change or update the nodes and/or the assignment of entities to nodes, for example add, change or delete one or more nodes, change the association of one or more entities to a node, or the like. It will be appreciated that any of steps 404 and 408 may be omitted, such that the nodes can be created automatically, manually or in a hybrid manner. In another example related to Zoology, which is similar (but not identical) to the example of FIG. 1, the following nodes may be created:
1. Animals in Britain.
2. Pets in Britain.
3. Dogs in Britain.
4. Cats in Britain.
5. Birds in Britain.
6. Birds born in 2021 in Britain.
7. Large Dogs in Britain.
8. Seabirds in Britain.
9. Seabirds in France.
10. Foxes in Britain.
11. Lizards in Britain.
12. Expensive pets.

It is appreciated that an entity may belong to multiple nodes. As an example, a Rottweiler may belong to category (3) Dogs in Britain (and thus also to categories (2) and (1)) and to category (7) Large Dogs in Britain. It is also appreciated that the subject of a node may explain why entities are assigned thereto. For example, category (8) "Seabirds of Britain" may comprise birds. Those birds may be comprised in other categories, such as (5) "Birds of Britain", (6) "Birds Born in 2021", "Birds Born to Specific Specie" (not shown), "Birds with Body Weight Below a Pound" (not shown), or the like.

Other annotated sets may be determined based on available data, internet search, properties related to the user, or the like. For example, the geographical areas may be determined based on a focus of interest of the user, such as based on the location or target area. Hence, the geographical areas may relate to Europe, Great Britain, France, but not to countries in Africa. Additionally or alternatively, the nodes may be based on available entities and their respective properties, including demographic properties.

It will be appreciated that any of steps 404 and 408 may be omitted, such that the nodes can be created automatically, manually, or in a hybrid manner, wherein the steps may be performed intermittently.

On step 412, edges may be created between the nodes, wherein each edge represents a relationship between the nodes it connects. Each node may be connected by one or more edges to other nodes. In some cases, two nodes may be connected by a plurality of edges.

On step 416, edges may be created automatically, for example based upon logical relationships between the subjects of the nodes, the entities contained within each node, or the like. As an example, a "Contained" relation may exist between node (3) "Dogs in Britain" and node (2) "Pets in Britain"; between node (3) "Dogs in Britain" and node (1) "Animals in Britain", or the like. Such relation can be automatically calculated by considering the entities associated with the nodes and identifying that all objects in a first node are comprised in a second node, such that the first node is a subset of a second node, or the like. Additionally or alternatively, a relation between a pair of sets or nodes may be determined based on logical rules of other relations, such as transitivity of relations, reflexivity, symmetry, or the like. As an example, a node A may be automatically be determined to be "contained" in node set C, based on node A being "Contained" in node B, and node B being contained in node C. Additionally or alternatively, a "Contained" relation may be determined only between node A and node B, as the "Contained" relation to C, even though is logically true, may be less relevant for search purposes, since it is transitive and indirect. As another example, a type of relation between sets may be "Member of the Same Hierarchy", "Complementary", or "Sibling Set". For example, node (4) has the relation "Member of the Same Hierarchy" to node (3). As the relation "Member of the Same Hierarchy" may be a symmetrical relation, node (3) may also have it with respect to node (4). The sibling relationship may be gleaned automatically by two nodes which are exclusive in members but are under the same hierarchy. Dogs and cats nodes have this relation as both are under pets and are mutually exclusive.

Further edges may be added automatically based on subject-matter relations between nodes, as may be deduced from texts, databases, or other sources.

On step 420, a user may change, add or delete relationships between nodes. For example, a user may add edges based on subject-matter relations between nodes derived from personal knowledge, needs, or other sources, delete relationships, expand relations to other nodes, narrow relations to subsets, or the like. As an example, a relation of "Similarity" may be manually determined and marked between nodes, based on human knowledge, logic, experience, or the like. For example, a user may decide that cats and dogs are similar, that dogs are similar to cats but not vice versa, or the like. In another example, a "Prey" relation may be created between the general node of cats and general node of birds. According to such relation, a prey relation may be created between cats in a specific location and birds in that location, e.g., between category (4) and category (5).

It will be appreciated that any of steps 416 and 420 may be omitted, such that the nodes can be created automatically, manually, or in a hybrid manner, wherein the steps may be performed intermittently.

Referring now to FIG. 2, showing an example of another graph which may be used for searching in the context of advertising, wherein each node in the graph may represent a category of potential customers in commerce, which may be targeted for specific products.

It may be noted that the node "Women Fashion Shoppers in NYC" 200 is contained in "Fashion Shoppers in NYC" 204, and "Fashion Shoppers in NYC" 204 is contained in "Fashion Shoppers in the US" 208. It may further be noted that there is no direct edge between "Women Fashion Shoppers in NYC" 200 and "Fashion Shoppers in the US" 208 as it is an implied relation.

"Luxury vehicle shoppers in NYC" 212 and "Jewelry shoppers in NYC" 216 are complementary and are both contained in "Luxury Shoppers in NYC" 220. "Luxury Vehicle Shoppers in NYC 212" is additionally contained in "Vehicle shoppers in NYC" 224.

Using the disclosed subject matter, users (such as advertisers) may be enabled to easily determine desired collection of entities, being a custom audience, by describing such objects or audience in free language, and obtaining results from a pre-prepared database, which may be generated from available data upon the user's needs and additional data.

Figure 5:
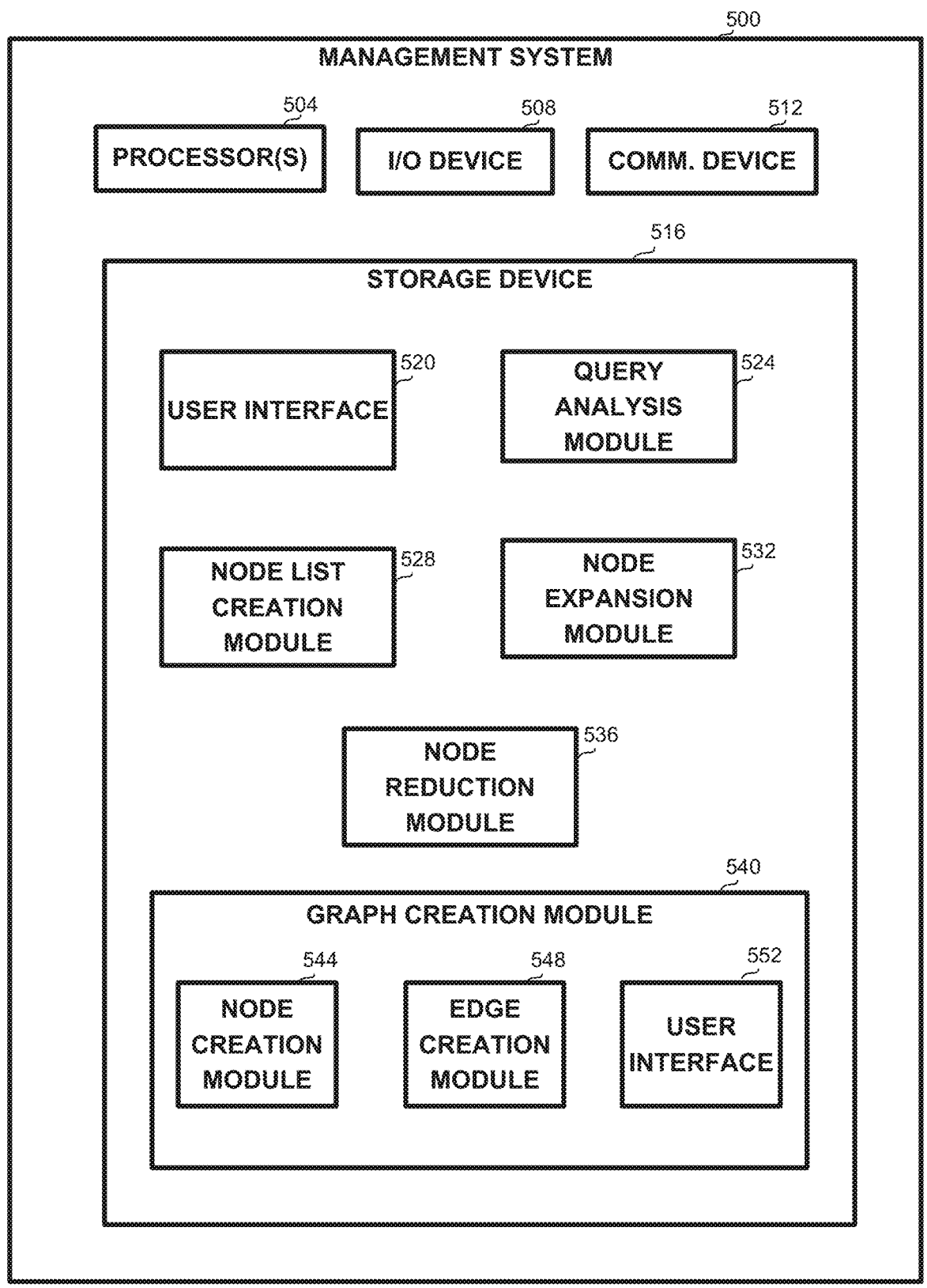
FIG. 5 is a block diagram of a system for retrieving information, in accordance with some exemplary embodiments of the disclosed subject matter.

Referring now to FIG. 5 showing a block diagram of a system for retrieving information, in accordance with some exemplary embodiments of the disclosure.

The system may comprise one or more computing platforms 500, such as a server, a laptop computer, a desktop computer, or the like. In some embodiments, computing platform 500 may be a server providing services to a plurality of client computing platforms, for example over a network.

In some exemplary embodiments of the disclosed subject matter, computing platform 500 can comprise processor 504. Processor 504 may be any one or more processors such as a Central Processing Unit (CPU), a microprocessor, an electronic circuit, an Integrated Circuit (IC) or the like. Processor 504 may be utilized to perform computations required by the system or any of its subcomponents.

In some exemplary embodiments of the disclosed subject matter, computing platform 500 can comprise an Input/Output (I/O) device 508 such as a display, a pointing device, a keyboard, a touch screen, a microphone, a speakerphone, a microphone, or the like. I/O device 508 can be utilized to provide output to and receive input from a user. For example, I/O device 508 can display a graph, a list of entities, or the like. Using I/O device 508 a user may enter a query, introduce changes to the query or to the results, or the like.

Computing platform 500 may comprise a communication device 512 for communicating with other computing platforms, such as clients, databases, or the like. Communication device 512 can be operative in communicating over any communication channel, such as a Wide Area Network (WAN), Local Area Network (LAN), Intranet, the Internet, or the like, using any applicable protocol.

Computing platform 500 may comprise a storage device 516. Storage device 516 may be a hard disk drive, a Flash disk, a Random Access Memory (RAM), a memory chip, or the like. In some exemplary embodiments, storage device 216 can retain program code operative to cause processor 504 to perform acts associated with any of the subcomponents of computing platform 500.

Storage device 516 can store the modules detailed below. The modules may be arranged as one or more executable files, dynamic libraries, static libraries, methods, functions, services, or the like, programmed in any programming language and under any computing environment.

Storage device 516 may store user interface 520 for receiving a query from a user, for example by the user typing text. User interface 520 may be further adapted to display to a user the query, the keywords, the logic term, the selected nodes, or the collection of entities, and receiving changes from the user to any of the above.

Storage device 516 may store query analysis module 524 for parsing and analyzing the query, extracting one or more keywords or keyword collections, and one or more logic terms. The logic terms may be general, such as "and", "or", "not", or the like, or related to the subject matter.

Storage device 516 may store node list creation module 528 for selecting nodes relevant to the keywords, and expanding with additional nodes based on logic rules, subject-matter related connections, or the like.

Storage device 516 may store node reduction module 536 for reducing one or more nodes from the collection of nodes, based for example on the logic terms extracted from the query.

Storage device 516 may store graph creation module 540, for creating the graph based upon the annotated or labeled entities.

Graph creation module 540 may comprise node creation module 544 for automatically or manually creating and populating the nodes, as detailed for example on step 400 of FIG. 4.

Graph creation module 540 may comprise edge creation module 548 for automatically or manually creating edges connecting the edges, as detailed for example on step 412 of FIG. 4.

Graph creation module 540 may comprise user interface 552, which may utilize I/O device 508 to provide a user with tools for changing, editing, adding or deleing one or more nodes or edges from the graph.

In some exemplary embodiments, a human user, such as an expert, a data scientist, or the like, may view each keyword list and its translation to the ordered list of sets for a further review. The human user may manually erase sets from the ordered list she considers not to be relevant to the keyword, e.g., that may not have a high probability to be house animals, such as the set of "birds that eat from a feeder" and the set of "mice", may change the order therebetween, or the like. Additionally or alternatively, the human user may manually find new sets to be added to the ordered list of sets, such as using related categories (ferrets), to use relations between sets to improve the ordered list of sets, or the like. The ordered list may be analyzed based on logic rules to find the actual objects described by the free-form. Referring to the above example, based on the intersection between the set of pets and the set of birds, objects that correspond to both sets, may be selected. Using such logic rule, birds, such for example, that unlike parrots, may not have a separated category or set to be selected, may be selected. As an example, some hawks that are actually pets even though there is no category for them under pets may be selected by applying logic rules between sets.

Additionally or alternatively, the user (e.g., the advertiser) may be enabled to provide additional input such as comments, updates, changes or the like, using free-text, on the resulted custom audience. The additional input may be utilized to dynamically update the custom audience or any other outcome sets. In some exemplary embodiments, minor changes may be tested in the pre-loaded parameters in order to improve the audience building process, enhancing the results, making the campaign more cost effective, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for determining entities according to free-form text, comprising:
    obtaining a graph having a plurality of nodes and at least one edge, wherein each of the plurality of nodes comprises a set of entities having a common property and a common subject, wherein each of the at least one edge connects two nodes and indicates a relationship between the two nodes, wherein the relationship is associated with at least one subject of the common subjects of the two nodes;
    obtaining a search query from a user, wherein the search query comprises a free-form text;
    automatically extracting from the free-form text at least one keyword combination and at least one logic term;
    for each of the at least one keyword combination, creating a list of nodes from the graph based on a relevancy of the common subject of each of the plurality of nodes with respect to the keyword combination;
    automatically creating a collection of entities that are comprised in the list of nodes, wherein said automatically creating comprises filtering out entities associated with a node that is automatically excluded based on the at least one logic term; and
    providing a response to the search query, wherein the response comprises the collection of entities.

2. The method of claim 1, further comprising enhancing the list of nodes in accordance with user input.

3. The method of claim 1, further comprising expanding the list of nodes in accordance with the at least one edge.

4. The method of claim 1, further comprising generating the graph, said generating comprising:
    receiving annotated sets of objects, each annotated set of objects represented as a node in the graph; and
    creating relationships between pairs of annotated sets, each relationship represented as an edge between two nodes corresponding to the pairs of annotated sets.

5. The method of claim 4, wherein at least one of the relationships is created automatically.

6. The method of claim 4, wherein at least one of the relationships is created manually.

7. The method of claim 1, wherein at least one of the relationships is based on logical relationship.

8. The method of claim 7, wherein the logical relationship is selected from the group consisting of: contained in; similar; under a same hierarchy; and complementary.

9. The method of claim 1, wherein at least one of the relationships is based on subject-matter knowledge related to at least some of the plurality of nodes.

10. The method of claim 1, wherein creating the list of nodes comprises selecting nodes whose common subject comprises at least one first word identical or related to at least one second word in the at least one keyword combination.

11. The method of claim 10, wherein creating the list of nodes further comprises adding at least one node which is connected by an edge to a node present on the ordered list of nodes.

12. The method of claim 11, wherein the edge is associated with a word from the at least one keyword combination.

13. The method of claim 11, wherein the list is ordered by relevancy of the nodes, and wherein the relevancy of a node is based on combined relevancy of each word contained in the common subject of the nodes to each keyword of the at least one keyword combination.

14. The method of claim 1, wherein the list is ordered.

15. A computerized apparatus having a processor, the processor being adapted to perform the steps of:
    obtaining a graph having a plurality of nodes and at least one edge, wherein each of the plurality of nodes comprises a set of entities having a common property and a common subject, wherein each of the at least one edge connects two nodes and indicating a relationship between the two nodes, wherein the relationship is associated with at least one subject of the common subjects of the two nodes;
    obtaining a search query from a user, wherein the search query comprises a free-form text;
    automatically extracting from the free-form text at least one keyword combination and at least one logic term;
    for each of the at least one keyword combination, creating a list of nodes from the graph based on a relevancy of the common subject of each of the plurality of nodes with respect to the keyword combination;
    automatically creating a collection of entities that are comprised in the list of nodes, wherein said automatically creating comprises filtering out entities associated with a node that is automatically excluded based on the at least one logic term; and
    providing a response to the search query, wherein the response comprises the collection of entities.

16. The apparatus of claim 15, wherein the processor is further adapted to perform:
    receiving annotated sets of objects, each annotated set of objects represented as a node in the graph;
    creating relationships between pairs of annotated sets, each relationship represented as an edge between two nodes corresponding to the pairs of annotated sets.

17. The apparatus of claim 16, wherein at least one of the relationships is created automatically or is based on logical relationship.

18. The apparatus of claim 16, wherein at least one of the relationships is created manually.

19. The apparatus of claim 15, wherein creating the list of nodes comprises selecting nodes whose common subject comprises at least one first word identical or related to at least one second word in the at least one keyword combination.

20. A computer program product comprising a non-transitory computer readable medium retaining program instructions, which instructions when read by a processor, cause the processor to perform:
    obtaining a graph having a plurality of nodes and at least one edge, wherein each of the plurality of nodes comprises a set of entities having a common property and a common subject, and each of the at least one edge connects two nodes and indicating a relationship between the two nodes, wherein the relationship is associated with at least one subject of the common subjects of the two nodes;

obtaining a search query from a user, wherein the search query comprises a free-form text;

automatically extracting from the free-form text at least one keyword combination and at least one logic term;

for each of the at least one keyword combination, creating a list of nodes from the graph based on a relevancy of the common subject of each of the plurality of nodes with respect to the keyword combination;

automatically creating a collection of entities that are comprised in the list of nodes, wherein said automatically creating comprises filtering out entities associated with a node that is automatically excluded based on the at least one logic term; and providing a response to the search query, wherein the response comprises the collection of entities.

* * * * *